(12) United States Patent
Xu et al.

(10) Patent No.: US 11,219,945 B2
(45) Date of Patent: Jan. 11, 2022

(54) PROCESS FOR CASTING ALUMINUM ALLOY PARTS

(71) Applicant: CITIC Dicastal CO., LTD., Hebei (CN)

(72) Inventors: Zuo Xu, Qinhuangdao (CN); Jianguo Zeng, Qinhuangdao (CN); Hanqi Wu, Qinhuangdao (CN); Hongyan Sun, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 0 days.

(21) Appl. No.: 16/446,880

(22) Filed: Jun. 20, 2019

(65) Prior Publication Data

US 2020/0206809 A1     Jul. 2, 2020

(30) Foreign Application Priority Data

Dec. 27, 2018  (CN) .......................... 201811608500.8

(51) Int. Cl.
| | |
|---|---|
| *B22D 18/04* | (2006.01) |
| *B22D 15/00* | (2006.01) |
| *B22D 21/00* | (2006.01) |
| *B60B 1/08* | (2006.01) |
| *C22C 21/00* | (2006.01) |

(52) U.S. Cl.
CPC .......... *B22D 18/04* (2013.01); *B22D 15/005* (2013.01); *B22D 21/007* (2013.01); *B60B 1/08* (2013.01); *C22C 21/00* (2013.01)

(58) Field of Classification Search
CPC ...... B22D 15/00; B22D 15/005; B22D 18/04; B22D 21/007; B22D 21/04
USPC ............................. 164/62, 63, 65, 119, 457
See application file for complete search history.

(56) References Cited

U.S. PATENT DOCUMENTS 3,961,662 A    6/1976  Balevski

FOREIGN PATENT DOCUMENTS

| | | |
|---|---|---|
| CN | 105583393 A | 5/2016 |
| CN | 105583394 A | 5/2016 |
| CN | 105618710 A | 6/2016 |
| CN | 105689688 A | 6/2016 |
| CN | 105583394 B | 5/2017 |
| CN | 105642866 B | 5/2017 |
| JP | S5850166 A | 3/1983 |
| JP | H07290224 A | 11/1995 |
| JP | 2014113638 A | 6/2014 |

OTHER PUBLICATIONS

Supplementary European Search Report in the European application No. 19196296.8, dated Mar. 30, 2020, 6 pgs.

*Primary Examiner* — Kevin P Kerns
(74) *Attorney, Agent, or Firm* — Cooper Legal Group, LLC

(57) ABSTRACT

A process for casting aluminum alloy parts is disclosed. The process includes the steps as follows: raising a liquid aluminum alloy; filling a mold; increasing pressure; solidifying formed by at least two stages of different pressure settings; and relieving pressure.

6 Claims, 6 Drawing Sheets

PROCESS FOR CASTING ALUMINUM ALLOY PARTS

CROSS-REFERENCE TO RELATED APPLICATIONS

This application is filed based upon and claims priority to Chinese Patent Application No. 201811608500.8, filed on Dec. 27, 2018, the contents of which are hereby incorporated by reference in its entirety.

BACKGROUND

With the development of society, vehicles have become an indispensable means of transportation for people. Vehicle wheels are important parts in vehicles, which directly affect the safety of vehicles. Aluminum alloy wheels have the advantages of light weight, easy molding, good mechanical properties, physical properties, corrosion resistance, and the like, so they are widely used in the vehicle field.

For casting aluminum alloy wheels, low-pressure casting process is mainly used, and the low-pressure casting has the advantages of easy mechanization, good filling, high yield, suitable for mass production and the like, and the aluminum liquid is solidified under pressure during the casting process, so that the strength of the finished product after solidification is high. However, with the rapid development of the vehicle industry and the continuous improvement of safety requirements for aluminum alloy wheels, the problem of the insufficient comprehensive performance of wheel castings, especially the low elongation rate, is becoming increasingly prominent.

SUMMARY

The disclosure relates to a metal casting process, in particular to a process for casting aluminum alloy parts.

A process for casting aluminum alloy parts is provided, which can effectively improve the comprehensive performance of the aluminum alloy parts.

In some embodiments of the disclosure, the process for casting aluminum alloy parts comprises the following steps:
  raising liquid;
  filling a mold;
  increasing pressure;
  solidifying consisting of at least two stages of different pressure settings; and
  relieving pressure.

In one embodiment of the disclosure, the step of solidifying consisting of at least two stages of different pressure settings comprises the following steps:
  a first high pressure solidifying stage;
  a first low pressure solidifying stage;
  a second high pressure solidifying stage;
  a second low pressure solidifying stage;
  a third high pressure solidifying stage; and
  a third low pressure solidifying stage.

In one embodiment of the disclosure, the first high pressure solidifying stage comprises:
  increasing the pressure in the mold cavity to 1400-1800 Mbar at a rate of 100-200 Mbar/s, maintaining the pressure for 3-8 s and then reducing the pressure in the mold cavity to 700-1100 Mbar at a rate of 100-200 Mbar/s.

In one embodiment of the disclosure, the first low pressure solidifying stage, the second low pressure solidifying stage and the third low pressure solidifying stage each comprise:
  maintaining the pressure in the mold cavity at 700-1100 Mbar for a preset time.

In one embodiment of the disclosure, the second high pressure solidifying stage comprises:
  increasing the pressure in the mold cavity to 1500-3000 Mbar at a rate of 120-250 Mbar/s, maintaining the pressure for 3-12 s, and then reducing the pressure in the mold cavity to 700-1100 Mbar at a rate of 120-250 Mbar/s.

In one embodiment of the disclosure, the third high pressure solidifying stage comprises:
  increasing the pressure in the mold cavity to 3000-4500 Mbar at a rate of 120-250 Mbar/s, maintaining the pressure for 3-12 s, and reducing the pressure in the mold cavity to 700-1100 Mbar at a rate of 120-250 Mbar/s.

In one embodiment of the disclosure, the step of raising liquid comprises:
  increasing the pressure of the aluminum liquid in the crucible to 200 Mbar at a rate of 10-30 Mbar/s.

In one embodiment of the disclosure, the step of filling the mold comprises:
  increasing the pressure of the aluminum liquid to 360 Mbar at a rate of 5-15 Mbar/s.

In one embodiment of the disclosure, the step of increasing pressure comprises:
  increasing the pressure in the mold cavity to 700-1100 Mbar at a rate of 40-80 Mbar/s.

In one embodiment of the disclosure, the step of relieving pressure comprises:
  reducing the pressure in the mold cavity to 0 Mbar from 700-1100 Mbar.

The disclosure provides a process for casting aluminum alloy parts. The process comprises the steps as follows: raising liquid; filling a mold; increasing pressure; solidifying consisting of at least two stages of different pressure settings; and relieving pressure. It can be seen that the casting process for aluminum alloy parts provided by the disclosure can effectively improve the comprehensive performance and production efficiency of the aluminum alloy parts by dividing the solidification process of casting the aluminum alloy parts into several stages, in which the pressure of each stage is different.

Other advantageous effects of the disclosure will be further illustrated in the detailed description in conjunction with the specific technical solutions.

DETAILED DESCRIPTION

Figure 1:
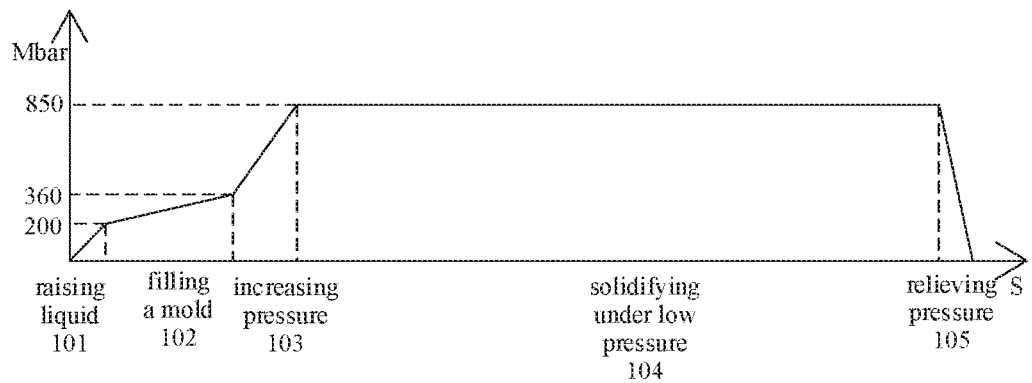
FIG. 1 is a schematic diagram showing the pressure setting at each stage in the process for casting aluminum alloy wheels in a reference embodiment of the disclosure.

In a reference embodiment, the process for casting aluminum alloy wheels is as follows: raising liquid, filling a mold, increasing pressure, solidifying under low pressure, and relieving pressure, in which the pressure setting at each stage of the casting process is shown in FIG. 1, and the specific process steps are as follows:

Step 101: raising liquid. The pressure of the aluminum liquid in the crucible is increased to 200 Mbar at a rate of 20 Mbar/s. Under this pressure, the aluminum liquid can be smoothly raised to the entrance of the mold cavity.

Step 102: filling a mold. The pressure of the aluminum liquid is increased to 360 Mbar at a rate of 10 Mbar/s, and the mold cavity is filled with the aluminum liquid at this time.

Step 103: increasing pressure. The pressure in the mold cavity is increased to 850 Mbar at a rate of 47 Mbar/s; after completion of the stage of filling the mold, the aluminum alloy wheel begins to solidify, and the solidification process of the wheel includes steps 103 and 104.

Step 104: solidifying under low pressure. The pressure in the mold cavity is maintained at 850 mbar until the overall solidification of the aluminum alloy wheel is completed, and the maintenance time is 270-280 s.

Step 105: relieving pressure. The pressure in the mold cavity is reduced to 0 Mbar from 850 Mbar, and the casting of aluminum alloy wheel is completed.

During the stages of increasing pressure and solidifying under low pressure, a certain intensity of air or water cooling may be applied to the corresponding position of the mold for a certain period of time to ensure that the aluminum alloy wheels are solidified in the order of the rim, the spokes and the flange, while ensuring the solidification speed.

The reference embodiment adopts the above casting process, the stable production process period of which is more than 310 s. After heat treatment, the performance is measured by sampling at different positions of the aluminum alloy wheel castings (take the average value of the samples of the six wheels at the same position), and the measuring results are shown in Table 1:

TABLE 1

| sampling position | elongation rate % | yield strength MPa | tensile strength MPa |
|---|---|---|---|
| rim | 4.0 | 192 | 255 |
| spoke | 3.5 | 188 | 250 |
| flange | 3.2 | 185 | 246 |

It can be seen from the above that the comprehensive performance of the aluminum alloy wheel castings is insufficient, especially the elongation rate is low, and the casting process time is relatively long.

An embodiment of the disclosure provides a process for casting aluminum alloy parts, in which the process comprises the following steps: raising liquid; filling a mold; increasing pressure; solidifying consisting of at least two stages of different pressure settings; and relieving pressure.

The process for casting the aluminum alloy parts provided by the embodiments of the disclosure divides the solidification process of the cast aluminum alloy parts into multiple stages, and the pressure of each stage is different, so as to effectively improve the comprehensive performance and production efficiency of the cast aluminum alloy parts.

In one embodiment, the step of raising liquid comprises: increasing the pressure of the aluminum liquid in the crucible to 200 Mbar at a rate of 10-30 Mbar/s, and under this pressure, the aluminum liquid can be smoothly raised to the entrance of the mold cavity to ensure stably raising liquid, thereby avoiding the incorporation of gas, oxidizing slag, etc. into the aluminum liquid, which affect the purity of the aluminum liquid.

In one embodiment, the step of filling the mold comprises: increasing the pressure of the aluminum liquid to 360 Mbar at a rate of 5-15 Mbar/s, and under this pressure, the mold cavity can be filled with the aluminum liquid, and ensure stably filling the mold, thereby avoiding porosity generation, slag inclusion, etc., which affect the quality of castings.

In one embodiment, the step of increasing pressure comprises: increasing the pressure in the mold cavity to 700-1100 Mbar at a rate of 40-80 Mbar/s, and under this pressure, the density of the aluminum liquid in the mold cavity and the fit of the aluminum liquid to the mold cavity are increased.

In one embodiment, the step of solidifying consisting of at least two stages of different pressure settings comprises the following steps: a first high pressure solidifying stage; a first low pressure solidifying stage; a second high pressure solidifying stage; a second low pressure solidifying stage; a third high pressure solidifying stage; and a third low pressure solidifying stage. By alternately applying high and low pressure during the solidification process of the aluminum alloy parts, the key portions of the aluminum alloy parts are solidified under high pressure, which increases the metal density of the key portions, thereby improving the comprehensive performance of the aluminum alloy parts.

In one embodiment, the first high pressure solidifying stage comprises: increasing the pressure in the mold cavity to 1400-1800 Mbar at a rate of 100-200 Mbar/s, maintaining the pressure for 3-8 s, and then reducing the pressure in the mold cavity to 700-1100 Mbar at a rate of 100-200 Mbar/s. Further increasing the pressure in the mold cavity can make the aluminum liquid of the first structure portion of the aluminum alloy part solidify under high pressure, increasing the metal density of this structure portion; after a few seconds, the pressure is reduced to a low pressure, avoiding the influence of long time high pressure on the process and mold state, etc., thereby improving the process stability. Here, the rate of increasing pressure, final pressure and maintaining time can be determined according to the specific material, equipment size, temperature and humidity. The principle of determination is based on the existing low-pressure casting technology. The rate of increasing pressure, final pressure and maintaining time in the following steps are also determined according to this principle.

In one embodiment, the first low pressure solidifying stage, the second low pressure solidifying stage and the third low pressure solidifying stage each comprise: maintaining the pressure in the mold cavity at 700-1100 Mbar for a preset time. In the first low pressure solidifying stage, the first structure portion that is firstly solidified can be solidified, and in the second low pressure solidifying stage, the second structure portion that is secondly solidified can be solidified, and in the third low pressure solidifying stage, the third structure portion that is thirdly solidified can be solidified. For example, the aluminum alloy part is an aluminum alloy wheel, the first structure portion may be a rim portion, the second structure portion may be a spoke portion, and the third structure portion may be a flange portion. Here, the preset time may be 40-90 s.

In one embodiment, the second high pressure solidifying stage comprises: increasing the pressure in the mold cavity to 1500-3000 Mbar at a rate of 120-250 Mbar/s, maintaining the pressure for 3-12 s, and then reducing the pressure in the mold cavity to 700-1100 Mbar at a rate of 120-250 Mbar/s. By increasing the pressure in the mold cavity again, the aluminum liquid of the second structure portion of the aluminum alloy part can be solidified under high pressure, increasing the metal density of this portion; after a few seconds, the pressure is reduced to a low pressure, avoiding the influence of long time high pressure on the process and mold state, etc., thereby improving the process stability.

In one embodiment, the third high pressure solidifying stage comprises: increasing the pressure in the mold cavity to 3000-4500 Mbar at a rate of 120-250 Mbar/s, maintaining the pressure for 3-12 s, and then reducing the pressure in the mold cavity to 700-1100 Mbar at a rate of 120-250 Mbar/s. By increasing the pressure in the mold cavity again, the aluminum liquid of the third structure portion of the aluminum alloy part can be solidified under high pressure, increasing the metal density of this portion; after a few seconds, the pressure is reduced to a low pressure, avoiding the influence of long time high pressure on the process and mold state, etc., thereby improving the process stability.

In one embodiment, the step of relieving pressure comprises: reducing the pressure in the mold cavity to 0 Mbar from 700-1100 Mbar, and the casting of the aluminum alloy part is completed.

Due to the different shapes of different aluminum alloy parts, there are also different thickness portions on one aluminum alloy part. Therefore, the solidification time and solidification sequence of different aluminum alloy parts and different portions of one aluminum alloy part are different. In actual production, in the above high and low pressure solidifying stages, a certain intensity of air cooling or water cooling is applied to the key position of the mold for an appropriate time to control the solidification sequence and solidification speed of the aluminum alloy parts. For example, in case of casting an aluminum alloy wheel, the key portions include a rim, a spoke and a flange. By sequentially applying cooling to the positions of mold respectively corresponding to the rim, the spoke and the flange, the casting of the aluminum alloy wheel is controlled to be sequentially solidified in the order of the rim, the spoke and the flange, and the solidification time is controlled. In this way, the rim, the spoke and the flange may correspond to the first structure portion, the second structure portion and the third structure portion, respectively. In addition, by applying cooling conditions to the mold, it is also possible to refine the crystal grains and avoid casting defects at the same time.

It should be understood by the person skilled in the art that in actual production, since the temperature of the mold cannot reach the temperature of the aluminum liquid, in the stage of filling the mold, the aluminum liquid inevitably solidifies first on the surface in contact with the mold, but it will not affect the comprehensive performance of the aluminum alloy parts as a whole.

The disclosure will be further described in detail below in conjunction with the drawings and specific embodiments. It is understood that the specific embodiments described herein are merely illustrative of the disclosure and are not intended to limit the disclosure.

It should be noted that the casting process in the embodiment of the disclosure only illustrates the pouring process in the casting process, and does not show processes such as metal melting, mold preparation, and demolding, etc.

Embodiment 1

The aluminum alloy parts of this embodiment are aluminum alloy wheels, and the casting process are as follows: raising liquid, filling a mold, increasing pressure, a first high pressure solidifying stage, a first low pressure solidifying stage, a second high pressure solidifying stage, a second low pressure solidifying stage, a third high pressure solidifying stage, a third low pressure solidifying stage, and relieving pressure. That is, the solidification process of casting the aluminum alloy wheel is divided into six stages: a first high pressure solidifying stage, a first low pressure solidifying stage, a second high pressure solidifying stage, a second low pressure solidifying stage, a third high pressure solidifying stage, and a third low pressure solidifying stage, and different pressures are set at each stage.

Figure 2:
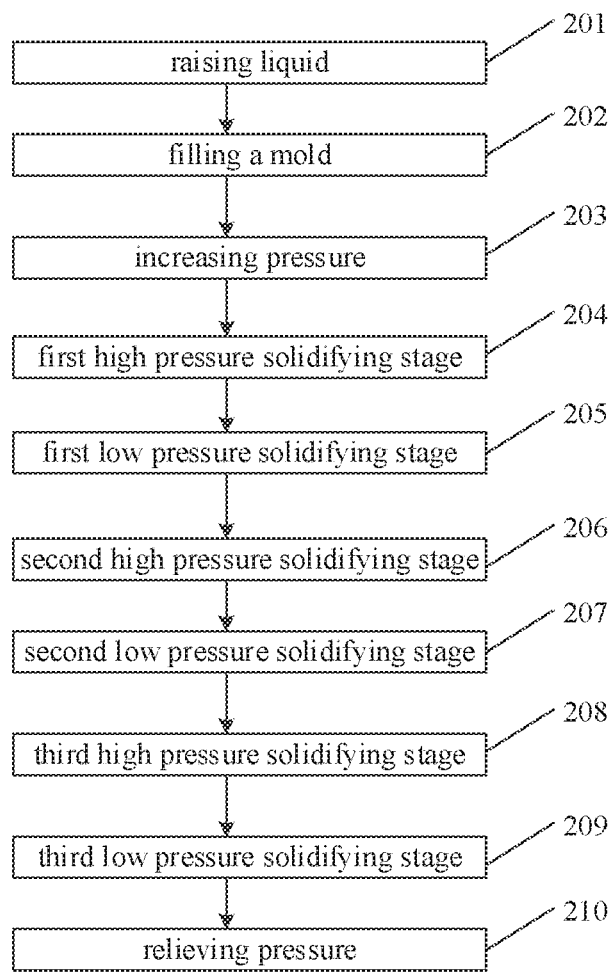
FIG. 2 is a schematic flow chart showing the process for casting aluminum alloy wheels according to Embodiment 1 of the disclosure.

The process of casting the aluminum alloy wheel is described in detail below as shown in FIG. 2, and the specific process steps are as follows:

Step 201: raising liquid. The pressure of the aluminum liquid in the crucible is increased to 200 Mbar at a rate of 20 Mbar/s.

Step 202: filling a mold. The pressure of the aluminum liquid is increased to 360 Mbar at a rate of 10 Mbar/s.

Step 203: increasing pressure. The pressure in the mold cavity is increased to 850 Mbar at a rate of 47 Mbar/s; after completion of the stage of filling the mold, the rim portion of the aluminum alloy wheel begins to solidify, and the solidification process of the rim includes steps 203, 204 and 205.

Step 204: a first high pressure solidifying stage. The pressure in the mold cavity is increased to 1500 Mbar at a rate of 150 Mbar/s and maintained for 5 s, and then the pressure in the mold cavity is reduced to 850 Mbar at a rate of 150 Mbar/s.

Step 205: a first low pressure solidifying stage. The pressure in the mold cavity is maintained at 850 Mbar for a period of 50-60 s, that is, the pressure is maintained until the solidification of the rim is completed.

The spokes of the aluminum alloy wheel begin to solidify when the solidification of the rim is completed, in which the solidification process of the spoke includes steps 206 and 207.

Step 206: a second high pressure solidifying stage. The pressure in the mold cavity is increased to 2500 Mbar at a rate of 150 Mbar/s and maintained for 5 s, and then the pressure in the mold cavity is reduced to 850 Mbar at a rate of 150 Mbar/s.

Step 207: a second low pressure solidifying stage. The pressure in the mold cavity is maintained at 850 Mbar for a period of 50-60 s, that is, the pressure is maintained until the solidification of the spoke is completed.

The flange of the aluminum alloy wheel begins to solidify when the solidification of the spoke is completed, and the solidification process of the flange includes steps 208 and 209.

Step 208: a third high pressure solidifying stage. The pressure in the mold cavity is increased to 3500 Mbar at a rate of 200 Mbar/s and maintained for 5 s, and then the pressure in the mold cavity is reduced to 850 Mbar at a rate of 200 Mbar/s.

Step 209: a third low pressure solidifying stage. The pressure in the mold cavity is maintained at 850 Mbar for a maintenance time of 50-60 s, that is, the pressure is maintained until the solidification of the flange is completed.

Step 210: relieving pressure. The pressure in the mold cavity is reduced to 0 Mbar from 850 Mbar, and the casting of the aluminum alloy wheel is completed.

Figure 3:
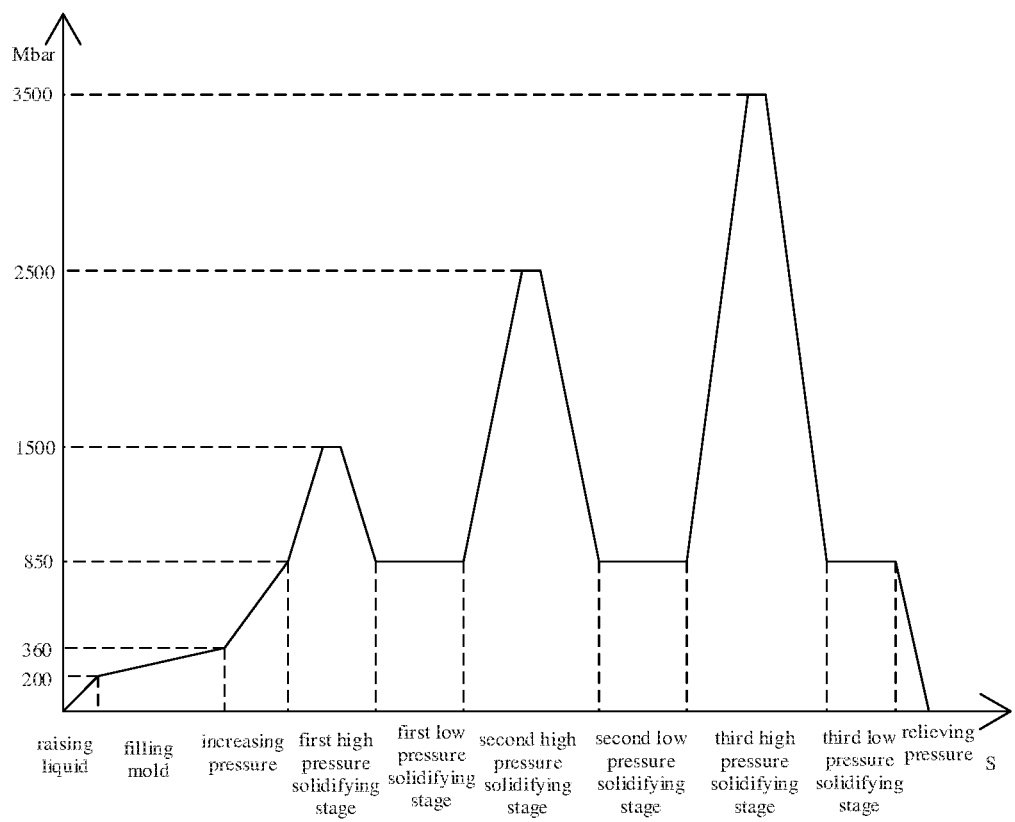
FIG. 3 is a schematic diagram showing the pressure setting at each stage in the process for casting aluminum alloy wheels according to Embodiment 1 of the disclosure.

The pressure settings at each stage in the above casting process are shown in FIG. 3.

During the solidification process of the rim, spoke and flange of the above aluminum alloy wheel, a certain intensity of air cooling or water cooling is applied to a corresponding solidification portion to ensure that the aluminum alloy wheel is solidified in the sequence of the rim, the spoke and the flange, and the solidification speed is ensured at the same time.

This embodiment adopts the above casting process, the stable production process period of which is 280 s. After heat treatment, the performance is measured by sampling at different positions of the aluminum alloy wheel castings (take the average value of the samples of the six wheels at the same position), and the measuring results are shown in Table 2:

TABLE 2

| sampling position | elongation rate % | yield strength MPa | tensile strength MPa |
|---|---|---|---|
| rim | 5.2 | 200 | 260 |
| spoke | 4.5 | 195 | 259 |
| flange | 3.9 | 194 | 252 |

Compared with the reference embodiment, the solidification process of casting the aluminum alloy wheel in this embodiment is divided into six stages, and the pressure at each stage is set differently, so that the elongation rate of the three key positions of the rim, the spoke and the flange of the cast aluminum alloy wheel is respectively improved by 30%, 29%, and 22%, the strength is slightly increased, and the production efficiency is increased by 10%.

Embodiment 2

The aluminum alloy parts of this embodiment are aluminum alloy wheels, and the specific process steps of this embodiment are as follows:

Step 301: raising liquid. The pressure of the aluminum liquid in the crucible is increased to 200 Mbar at a rate of 20 Mbar/s.

Step 302: filling a mold. The pressure of the aluminum liquid is increased to 360 Mbar at a rate of 10 Mbar/s.

Step 303: increasing pressure. The pressure in the mold cavity is increased to 850 Mbar at a rate of 47 Mbar/s; after completion of the stage of filling the mold, the rim portion of the aluminum alloy wheel begins to solidify, and the solidification process of the rim includes steps 303, 304 and 305.

Step 304: a first high pressure solidifying stage. The pressure in the mold cavity is increased to 1800 Mbar at a rate of 150 Mbar/s and maintained for 5 s, and then the pressure in the mold cavity is reduced to 850 Mbar at a rate of 150 Mbar/s.

Step 305: a first low pressure solidifying stage. The pressure in the mold cavity is maintained at 850 Mbar for a period of 40-50 s, that is, the pressure is maintained until the solidification of the rim is completed.

The spokes of the aluminum alloy wheel begin to solidify when the solidification of the rim is completed, in which the solidification process of the spoke includes steps 306 and 307.

Step 306: a second high pressure solidifying stage. The pressure in the mold cavity is increased to 3000 Mbar at a rate of 200 Mbar/s and maintained for 5 s, and then the pressure in the mold cavity is reduced to 850 Mbar at a rate of 200 Mbar/s.

Step 307: a second low pressure solidifying stage. The pressure in the mold cavity is maintained at 850 Mbar for a period of 40-50 s, that is, the pressure is maintained until the solidification of the spoke is completed.

The flange of the aluminum alloy wheel begins to solidify when the solidification of the spoke is completed, and the solidification process of the flange includes steps 308 and 309.

Step 308: a third high pressure solidifying stage. The pressure in the mold cavity is increased to 4500 Mbar at a rate of 250 Mbar/s and maintained for 5 s, and then the pressure in the mold cavity is reduced to 850 Mbar at a rate of 250 Mbar/s.

Step 309: a third low pressure solidifying stage. The pressure in the mold cavity is maintained at 850 Mbar for a maintenance time of 40-50 s, that is, the pressure is maintained until the solidification of the flange is completed.

Step 310: relieving pressure. The pressure in the mold cavity is reduced to 0 Mbar from 850 Mbar, and the casting of the aluminum alloy wheel is completed.

Figure 4:
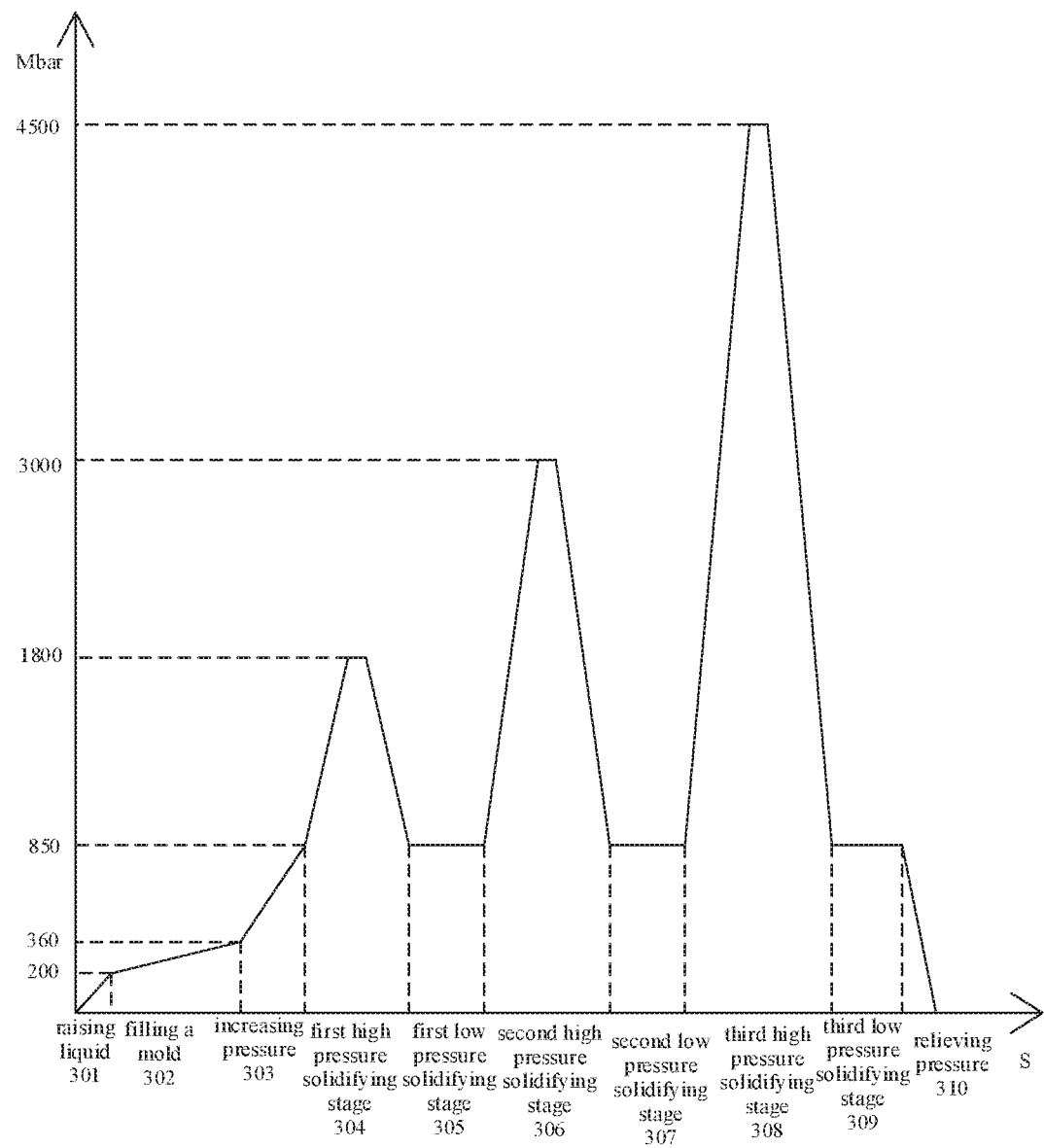
FIG. 4 is a schematic diagram showing the pressure setting at each stage in the process for casting aluminum alloy wheels according to Embodiment 2 of the disclosure.

The pressure settings at each stage in the above casting process are shown in FIG. 4.

The process flow of this embodiment is the same as that of Embodiment 1 except that the parameters of the solidification stage are different from those of Embodiment 1, so the flow diagram is no longer shown separately.

During the solidification process of the rim, spoke and flange of the above aluminum alloy wheel, a certain intensity of air cooling or water cooling is applied to a corresponding solidification portion to ensure that the aluminum alloy wheel is solidified in the sequence of the rim, the spoke and the flange, and the solidification speed is ensured at the same time.

This embodiment adopts the above casting process, the stable production process period of which is 260 s. After heat treatment, the performance is measured by sampling at different positions of the aluminum alloy wheel castings (take the average value of the samples of the six wheels at the same position), and the measuring results are shown in Table 3:

TABLE 3

| sampling position | elongation rate % | yield strength MPa | tensile strength MPa |
|---|---|---|---|
| rim | 6.0 | 202 | 266 |
| spoke | 5.5 | 198 | 260 |
| flange | 4.6 | 198 | 255 |

Compared with the reference embodiment, the pressure during the solidification process of casting the aluminum alloy wheel in this embodiment is adjusted and changed, so that the elongation rate of the three key positions of the rim, the spoke and the flange of the cast aluminum alloy wheel is respectively improved by 50%, 57%, and 44%, the strength is slightly increased, and the production efficiency is increased by 16%.

Embodiment 3

The aluminum alloy parts of this embodiment are aluminum alloy wheels, and the specific process steps of this embodiment are as follows:

Step 401: raising liquid. The pressure of the aluminum liquid in the crucible is increased to 200 Mbar at a rate of 10 Mbar/s.

Step 402: filling a mold. The pressure of the aluminum liquid is increased to 360 Mbar at a rate of 5 Mbar/s.

Step 403: increasing pressure. The pressure in the mold cavity is increased to 700 Mbar at a rate of 40 Mbar/s; after completion of the stage of filling the mold, the rim portion of the aluminum alloy wheel begins to solidify, and the solidification process of the rim includes steps 403, 404 and 405.

Step 404: a first high pressure solidifying stage. The pressure in the mold cavity is increased to 1400 Mbar at a rate of 100 Mbar/s and maintained for 3 s, and then the pressure in the mold cavity is reduced to 700 Mbar at a rate of 100 Mbar/s.

Step 405: a first low pressure solidifying stage. The pressure in the mold cavity is maintained at 700 Mbar for a period of 40-50 s, that is, the pressure is maintained until the solidification of the rim is completed.

The spokes of the aluminum alloy wheel begin to solidify when the solidification of the rim is completed, in which the solidification process of the spoke includes steps 406 and 407.

Step 406: a second high pressure solidifying stage. The pressure in the mold cavity is increased to 1500 Mbar at a rate of 120 Mbar/s and maintained for 3 s, and then the pressure in the mold cavity is reduced to 700 Mbar at a rate of 120 Mbar/s.

Step 407: a second low pressure solidifying stage. The pressure in the mold cavity is maintained at 700 Mbar for a period of 40-50 s, that is, the pressure is maintained until the solidification of the spoke is completed.

The flange of the aluminum alloy wheel begins to solidify when the solidification of the spoke is completed, and the solidification process of the flange includes steps 408 and 409.

Step 408: a third high pressure solidifying stage. The pressure in the mold cavity is increased to 3000 Mbar at a rate of 120 Mbar/s and maintained for 3 s, and then the pressure in the mold cavity is reduced to 700 Mbar at a rate of 120 Mbar/s.

Step 409: a third low pressure solidifying stage. The pressure in the mold cavity is maintained at 700 Mbar for a maintenance time of 40-50 s, that is, the pressure is maintained until the solidification of the flange is completed.

Step 410: relieving pressure. The pressure in the mold cavity is reduced to 0 Mbar from 700 Mbar, and the casting of the aluminum alloy wheel is completed.

The pressure diagram of each stage in the above casting process is similar to that of Embodiment 1, so it will not be separately shown for succinct expression.

Figure 5:
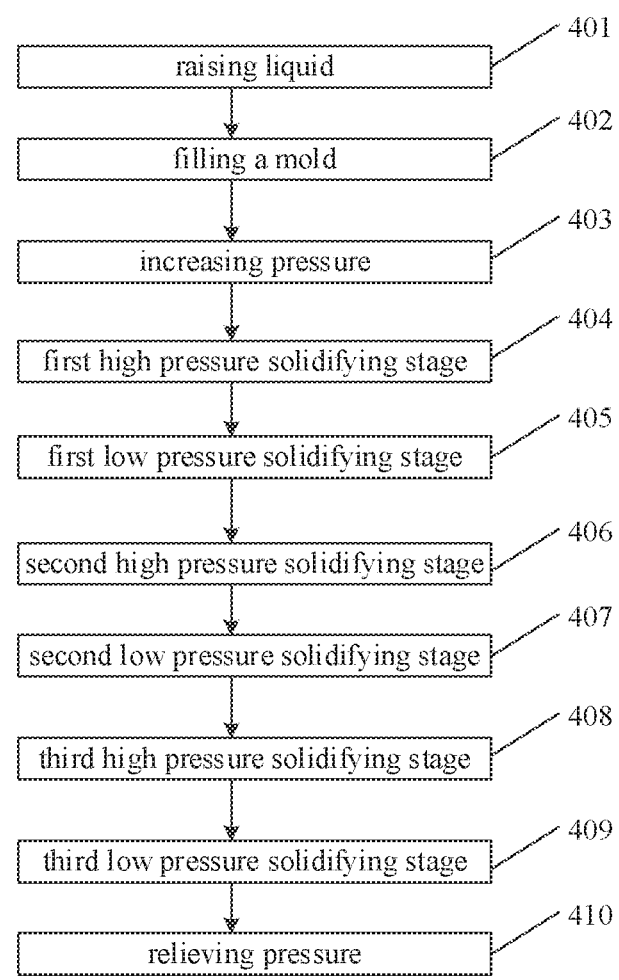
FIG. 5 is a schematic flow chart showing the process for casting aluminum alloy wheels according to Embodiment 3 of the disclosure.

The process flow content of this embodiment shown in FIG. 5 is the same as that of Embodiment 1 except that the parameters of the solidification stage are different from those of Embodiment 1.

During the solidification process of the rim, spoke and flange of the above aluminum alloy wheel, a certain intensity of air cooling or water cooling is applied to a corresponding solidification portion to ensure that the aluminum alloy wheel is solidified in the sequence of the rim, the spoke and the flange, and the solidification speed is ensured at the same time.

This embodiment adopts the above casting process, the stable production process period of which is 285 s. After heat treatment, the performance is measured by sampling at different positions of the aluminum alloy wheel castings (take the average value of the samples of the six wheels at the same position), and the measuring results are shown in Table 4:

TABLE 4

| sampling position | elongation rate % | yield strength MPa | tensile strength MPa |
| --- | --- | --- | --- |
| rim | 4.8 | 198 | 258 |
| spoke | 4.2 | 194 | 244 |
| flange | 3.7 | 192 | 250 |

Compared with the reference embodiment, the pressure during the solidification process of casting the aluminum alloy wheel in this embodiment is adjusted and changed, so that the elongation rate of the three key positions of the rim, the spoke and the flange of the cast aluminum alloy wheel is respectively improved by 20%, 20%, and 16%, the strength is slightly increased, and the production efficiency is increased by 8%.

Embodiment 4

The aluminum alloy parts of this embodiment are aluminum alloy wheels, and the specific process steps of this embodiment are as follows:

Step 501: raising liquid. The pressure of the aluminum liquid in the crucible is increased to 200 Mbar at a rate of 30 Mbar/s.

Step 502: filling a mold. The pressure of the aluminum liquid is increased to 360 Mbar at a rate of 15 Mbar/s.

Step 503: increasing pressure. The pressure in the mold cavity is increased to 1100 Mbar at a rate of 80 Mbar/s; after completion of the stage of filling the mold, the rim portion of the aluminum alloy wheel begins to solidify, and the solidification process of the rim includes steps 503, 504 and 505.

Step 504: a first high pressure solidifying stage. The pressure in the mold cavity is increased to 1800 Mbar at a rate of 200 Mbar/s and maintained for 8 s, and then the pressure in the mold cavity is reduced to 1100 Mbar at a rate of 200 Mbar/s.

Step 505: a first low pressure solidifying stage. The pressure in the mold cavity is maintained at 1100 Mbar for a period of 40-50 s, that is, the pressure is maintained until the solidification of the rim is completed.

The spokes of the aluminum alloy wheel begin to solidify when the solidification of the rim is completed, in which the solidification process of the spoke includes steps 506 and 507.

Step 506: a second high pressure solidifying stage. The pressure in the mold cavity is increased to 3000 Mbar at a rate of 250 Mbar/s and maintained for 12 s, and then the pressure in the mold cavity is reduced to 1100 Mbar at a rate of 250 Mbar/s.

Step 507: a second low pressure solidifying stage. the pressure in the mold cavity is maintained at 1100 Mbar for a period of 40-50 s, that is, the pressure is maintained until the solidification of the spoke is completed.

The flange of the aluminum alloy wheel begins to solidify when the solidification of the spoke is completed, and the solidification process of the flange includes steps 508 and 509.

Step 508: a third high pressure solidifying stage. The pressure in the mold cavity is increased to 4500 Mbar at a rate of 250 Mbar/s and maintained for 12 s, and then the pressure in the mold cavity is reduced to 1100 Mbar at a rate of 250 Mbar/s.

Step 509: a third low pressure solidifying stage. The pressure in the mold cavity is maintained at 1100 Mbar for a maintenance time of 40-50 s, that is, the pressure is maintained until the solidification of the flange is completed.

Step 510: relieving pressure. The pressure in the mold cavity is reduced to 0 Mbar from 1100 Mbar, and the casting of the aluminum alloy wheel is completed.

The pressure diagram of each stage in the above casting process is similar to that of embodiment 1, so it will not be separately shown for succinct expression.

Figure 6:
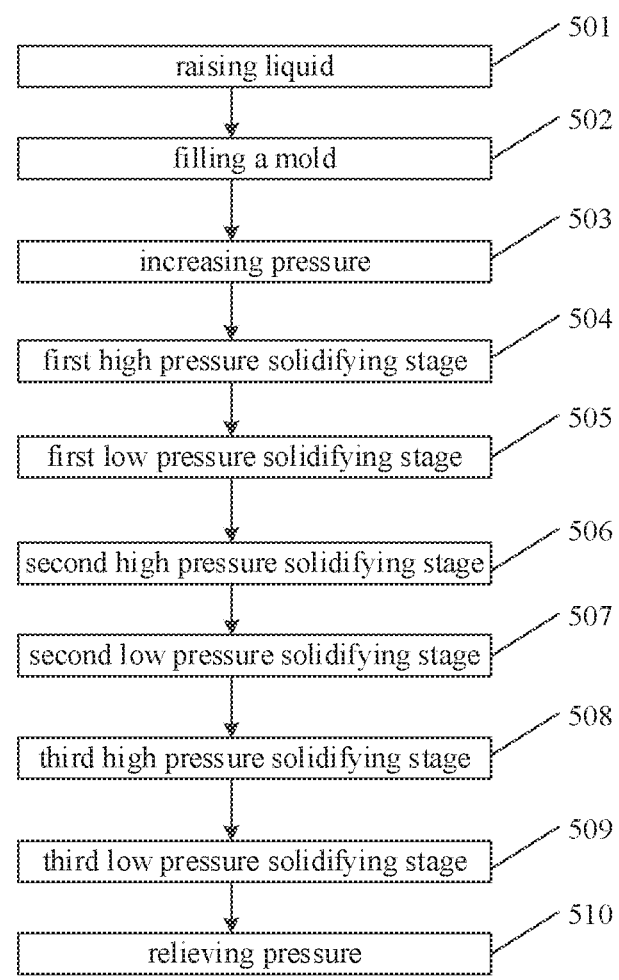
FIG. 6 is a schematic flow chart showing the process for casting aluminum alloy wheels according to Embodiment 4 of the disclosure.

The process flow content of this embodiment shown in FIG. 6 is the same as that of Embodiment 1 except that the parameters of the solidification stage are different from those of Embodiment 1.

During the solidification process of the rim, spoke and flange of the above aluminum alloy wheel, a certain intensity of air cooling or water cooling is applied to a corresponding solidification portion to ensure that the aluminum alloy wheel is solidified in the sequence of the rim, the spoke and the flange, and the solidification speed is ensured at the same time.

This embodiment adopts the above casting process, the stable production process period of which is 254 s. After heat treatment, the performance is measured by sampling at different positions of the aluminum alloy wheel castings (take the average value of the samples of the six wheels at the same position), and the measuring results are shown in Table 5:

TABLE 5

| sampling position | elongation rate % | yield strength MPa | tensile strength MPa |
| --- | --- | --- | --- |
| rim | 6.5 | 205 | 268 |
| spoke | 5.7 | 199 | 263 |
| flange | 4.8 | 200 | 257 |

Compared with the reference embodiment, the pressure during the solidification process of casting the aluminum alloy wheel in this embodiment is adjusted and changed, so that the elongation rate of the three key positions of the rim, the spoke and the flange of the cast aluminum alloy wheel is respectively improved by 62%, 63%, and 50%, the strength is slightly increased, and the production efficiency is increased by 18%.

Embodiment 5

The aluminum alloy parts of this embodiment are aluminum alloy wheels, and the specific process steps of this embodiment are as follows:

Step 601: raising liquid. The pressure of the aluminum liquid in the crucible is increased to 200 Mbar at a rate of 20 Mbar/s.

Step 602: filling a mold. The pressure of the aluminum liquid is increased to 360 Mbar at a rate of 10 Mbar/s.

Step 603: increasing pressure. The pressure in the mold cavity is increased to 900 Mbar at a rate of 60 Mbar/s; after completion of the stage of filling the mold, the rim portion of the aluminum alloy wheel begins to solidify, and the solidification process of the rim includes steps 603, 604 and 605.

Step 604: a first high pressure solidifying stage. The pressure in the mold cavity is increased to 1600 Mbar at a rate of 150 Mbar/s and maintained for 6 s, and then the pressure in the mold cavity is reduced to 900 Mbar at a rate of 150 Mbar/s.

Step 605: a first low pressure solidifying stage. The pressure in the mold cavity is maintained at 900 Mbar for a period of 45-55 s, that is, the pressure is maintained until the solidification of the rim is completed.

The spokes of the aluminum alloy wheel begin to solidify when the solidification of the rim is completed, in which the solidification process of the spoke includes steps 606 and 607.

Step 606: a second high pressure solidifying stage. The pressure in the mold cavity is increased to 2250 Mbar at a rate of 185 Mbar/s and maintained for 8 s, and then the pressure in the mold cavity is reduced to 900 Mbar at a rate of 185 Mbar/s.

Step 607: a second low pressure solidifying stage. The pressure in the mold cavity is maintained at 900 Mbar for a period of 45-55 s, that is, the pressure is maintained until the solidification of the spoke is completed.

The flange of the aluminum alloy wheel begins to solidify when the solidification of the spoke is completed, and the solidification process of the flange includes steps 608 and 609.

Step 608: a third high pressure solidifying stage. The pressure in the mold cavity is increased to 3750 Mbar at a rate of 185 Mbar/s and maintained for 8 s, and then the pressure in the mold cavity is reduced to 900 Mbar at a rate of 185 Mbar/s.

Step 609: a third low pressure solidifying stage. The pressure in the mold cavity is maintained at 900 Mbar for a maintenance time of 45-55 s, that is, the pressure is maintained until the solidification of the flange is completed.

Step 610: relieving pressure. The pressure in the mold cavity is reduced to 0 Mbar from 900 Mbar, and the casting of the aluminum alloy wheel is completed.

The pressure diagram of each stage in the above casting process is similar to that of Embodiment 1, so it will not be separately shown for succinct expression.

Figure 7:
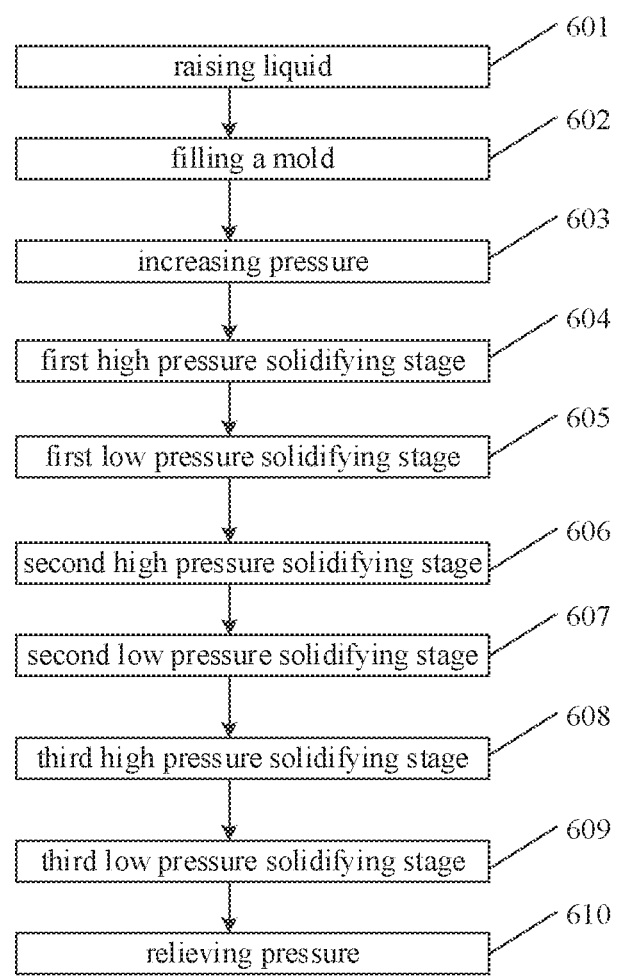
FIG. 7 is a schematic flow chart showing the process for casting aluminum alloy wheels according to Embodiment 5 of the disclosure.

The process flow content of this embodiment shown in FIG. 7 is the same as that of Embodiment 1 except that the parameters of each stage are different from those of Embodiment 1.

During the solidification process of the rim, spoke and flange of the above aluminum alloy wheel, a certain intensity of air cooling or water cooling is applied to a corresponding solidification portion to ensure that the aluminum alloy wheel is solidified in the sequence of the rim, the spoke and the flange, and the solidification speed is ensured at the same time.

This embodiment adopts the above casting process, the stable production process period of which is 272 s. After heat treatment, the performance is measured by sampling at different positions of the aluminum alloy wheel castings (take the average value of the samples of the six wheels at the same position), and the measuring results are shown in Table 6:

TABLE 6

| sampling position | elongation rate % | yield strength MPa | tensile strength MPa |
| --- | --- | --- | --- |
| rim | 5.6 | 198 | 262 |
| spoke | 4.5 | 195 | 261 |
| flange | 4.1 | 194 | 253 |

Compared with the reference embodiment, the pressure during the solidification process of casting the aluminum alloy wheel in this embodiment is adjusted and changed, so that the elongation rate of the three key positions of the rim, the spoke and the flange of the cast aluminum alloy wheel is respectively improved by 40%, 28%, and 28%, the strength is slightly increased, and the production efficiency is increased by 12%.

In summary, the disclosure adjusts the pressure during the pressure casting solidification process of the aluminum alloy wheel, that is, a high pressure is applied at the beginning of the solidification of each key portion, and after a few seconds, the pressure reduces to a low pressure to make the key portion solidify under maintaining pressure, while cooperating with a reasonable cooling process, so that the production efficiency of cast aluminum alloy wheels is increased by 8-18%, and the elongation is increased by 16-50%.

The above is only a specific description of the preferred embodiments of the disclosure, and is not intended to limit the scope of the disclosure, and any other equivalents are intended to fall within the scope of the disclosure.

The invention claimed is:

1. A process for casting an aluminum alloy part, comprising the following consecutive steps in a single cycle of casting:
   raising a liquid aluminum alloy;
   filling a mold;
   increasing pressure;
   solidifying consisting of at least two stages of different pressure settings; and
   relieving pressure,
   wherein the step of solidifying is independent of the step of relieving pressure,
   wherein the step of solidifying consisting of at least two stages of different pressure settings comprises the following steps:
      a first high pressure solidifying stage, comprising: increasing a pressure in a mold cavity to 1400-1800 Mbar at a rate of 100-200 Mbar/s, maintaining the pressure for 3-8 s, and then reducing the pressure in the mold cavity to 700-1100 Mbar at a rate of 100-200 Mbar/s;
      a first low pressure solidifying stage;
      a second high pressure solidifying stage, comprising: increasing the pressure in the mold cavity to 1500-3000 Mbar at a rate of 120-250 Mbar/s, maintaining the pressure for 3-12 s, and then reducing the pressure in the mold cavity to 700-1100 Mbar at a rate of 120-250 Mbar/s;
      a second low pressure solidifying stage;
      a third high pressure solidifying stage, comprising: increasing the pressure in the mold cavity to 3000-4500 Mbar at a rate of 120-250 Mbar/s, maintaining the pressure for 3-12 s, and then reducing the pressure in the mold cavity to 700-1100 Mbar at a rate of 120-250 Mbar/s; and
      a third low pressure solidifying stage.

2. The process for casting an aluminum alloy part according to claim 1, wherein the first low pressure solidifying stage, the second low pressure solidifying stage and the third low pressure solidifying stage each comprise:
   maintaining the pressure in the mold cavity at 700-1100 Mbar for a preset time.

3. The process for casting an aluminum alloy part according to claim 1, wherein the step of raising the liquid aluminum alloy comprises:
   increasing a pressure of the liquid aluminum alloy in a crucible to 200 Mbar at a rate of 10-30 Mbar/s.

4. The process for casting an aluminum alloy part according to claim 1, wherein the step of filling the mold comprises:
   increasing a pressure of the liquid aluminum alloy to 360 Mbar at a rate of 5-15 Mbar/s.

5. The process for casting an aluminum alloy part according to claim 1, wherein the step of increasing pressure comprises:
   increasing the pressure in the mold cavity to 700-1100 Mbar at a rate of 40-80 Mbar/s.

6. The process for casting an aluminum alloy part according to claim 1, wherein the step of relieving pressure comprises:
   reducing the pressure in the mold cavity to 0 Mbar from 700-1100 Mbar.

* * * * *